(12) United States Patent
Bergman et al.

(10) Patent No.: US 9,046,324 B2
(45) Date of Patent: Jun. 2, 2015

(54) ANTIBALLISTIC ARTICLE AND METHOD OF PRODUCING SAME

(71) Applicant: Israel Military Industries Ltd., Ramat Hasharon (IL)

(72) Inventors: Ron Bergman, Kiryat-Ono (IL); Benjamin Yavin, Rishon Lezion (IL)

(73) Assignee: ISRAEL MILITARY INDUSTRIES LTD., Ramat Hasharon (IL)

( * ) Notice: Subject to any disclaimer, the term of this patent is extended or adjusted under 35 U.S.C. 154(b) by 40 days.

(21) Appl. No.: 13/755,475

(22) Filed: Jan. 31, 2013

(65) Prior Publication Data

US 2014/0076139 A1 Mar. 20, 2014

Related U.S. Application Data

(63) Continuation of application No. PCT/IL2012/000264, filed on Jun. 27, 2012.

(30) Foreign Application Priority Data

Jun. 30, 2011 (IL) .......................................... 213865

(51) Int. Cl.
| | |
|---|---|
| *F41H 5/02* | (2006.01) |
| *F41H 5/04* | (2006.01) |
| *B63B 3/10* | (2006.01) |
| *B64D 7/00* | (2006.01) |
| *F41H 1/02* | (2006.01) |

(Continued)

(52) U.S. Cl.
CPC ............. *F41H 5/0421* (2013.01); *Y10T 156/10* (2015.01); *F41H 5/0428* (2013.01); *B63B 3/10* (2013.01); *B64D 7/00* (2013.01); *F41H 1/02* (2013.01); *F41H 1/04* (2013.01); *F41H 5/0414* (2013.01); *F41H 7/02* (2013.01)

(58) Field of Classification Search
CPC ... F41H 5/0492; F41H 5/0428; F41H 5/0414; F41H 5/0421; F41H 5/04; F42D 5/05
USPC .............................. 89/36.01–36.17, 903–907
See application file for complete search history.

(56) References Cited

U.S. PATENT DOCUMENTS

| | | |
|---|---|---|
| 3,633,520 A | 1/1972 | Stiglich, Jr. |
| 3,683,828 A | 8/1972 | Alliegro et al. |
| 3,702,593 A | 11/1972 | Fine |

(Continued)

FOREIGN PATENT DOCUMENTS

| | | |
|---|---|---|
| EP | 0322719 A1 | 7/1989 |
| EP | 1288607 A1 | 3/2003 |

(Continued)

*Primary Examiner* — Samir Abdosh
(74) *Attorney, Agent, or Firm* — Harness, Dickey & Pierce, P.L.C.

(57) ABSTRACT

A light weight pre-stressed antiballistic article including a monolith ceramic plate/tile bonded to a thin lightweight thermal expansion material with an adhesive, characterized, in that the thermal expansion material has a thermal expansion coefficient at least 50% higher than the ceramic plate/tile, and the thermal expansion material is bonded to either the front face, back face or both faces of the ceramic plate/tile at a bonding temperature of between 50° C. and 250° C. with adhesive and subsequently cooled, whereby upon cooling, the bonded thermal expansion material contracts to a greater extent than the ceramic plate/tile, exerting compression stress on the ceramic plate/tile.

7 Claims, 6 Drawing Sheets

Detail B

(51) Int. Cl.
*F41H 1/04* (2006.01)
*F41H 7/02* (2006.01)

(56) References Cited

U.S. PATENT DOCUMENTS

| | | | |
|---|---|---|---|
| 3,765,300 A | 10/1973 | Taylor et al. | |
| 3,796,564 A | 3/1974 | Taylor et al. | |
| 3,802,850 A * | 4/1974 | Clougherty | 428/547 |
| 4,836,084 A * | 6/1989 | Vogelesang et al. | 89/36.02 |
| 5,014,593 A | 5/1991 | Auyer et al. | |
| 5,032,466 A * | 7/1991 | Cappa | 428/625 |
| 5,354,536 A | 10/1994 | Ezis | |
| 5,371,049 A | 12/1994 | Moffett et al. | |
| 5,372,978 A | 12/1994 | Ezis | |
| 5,654,518 A | 8/1997 | Dobbs | |
| 6,389,594 B1 | 5/2002 | Yavin | |
| 6,408,733 B1 | 6/2002 | Perciballi | |
| 6,609,452 B1 | 8/2003 | McCormick et al. | |
| 6,805,034 B1 | 10/2004 | McCormick et al. | |
| 6,912,944 B2 | 7/2005 | Lucuta et al. | |
| 6,973,879 B1 | 12/2005 | McElroy et al. | |
| 7,026,045 B2 | 4/2006 | Rettenbacher et al. | |
| 7,037,865 B1 | 5/2006 | Kimberly | |
| 7,070,242 B2 | 7/2006 | Mears et al. | |
| 7,104,177 B1 | 9/2006 | Aghajanian et al. | |
| 7,104,178 B1 * | 9/2006 | Zank | 89/36.17 |
| 7,128,963 B2 | 10/2006 | Benitsch | |
| 7,238,414 B2 | 7/2007 | Benitsch et al. | |
| 7,284,469 B2 | 10/2007 | Raichel et al. | |
| 7,284,470 B2 | 10/2007 | Huber et al. | |
| 7,549,366 B2 | 6/2009 | Park et al. | |
| 7,562,612 B2 | 7/2009 | Lucuta et al. | |
| 7,571,493 B1 | 8/2009 | Purvis et al. | |
| 7,598,651 B2 | 10/2009 | Kornbluh et al. | |
| 7,598,652 B2 | 10/2009 | Kornbluh et al. | |
| 7,608,322 B2 | 10/2009 | Thurau et al. | |
| 7,617,757 B2 | 11/2009 | Dickson | |
| 7,622,405 B1 | 11/2009 | Arvidson et al. | |
| 7,642,206 B1 | 1/2010 | Bhatnagar et al. | |
| 7,681,485 B2 | 3/2010 | Neal | |
| 7,718,245 B2 | 5/2010 | Bhatnagar et al. | |
| 7,762,175 B1 | 7/2010 | Bhatnagar et al. | |
| 7,799,710 B1 | 9/2010 | Tan | |
| 7,827,898 B2 | 11/2010 | Park et al. | |
| 7,827,899 B2 | 11/2010 | Ravid et al. | |
| 2006/0213360 A1 * | 9/2006 | Ravid et al. | 89/36.01 |
| 2009/0293709 A1 * | 12/2009 | Joynt et al. | 89/36.02 |

FOREIGN PATENT DOCUMENTS

| | | |
|---|---|---|
| EP | 1 925 903 A2 | 5/2008 |
| EP | 2208961 A1 | 7/2010 |
| GB | 1 352 418 | 5/1974 |
| WO | WO-2008054843 A2 | 5/2008 |
| WO | WO 2008/130451 | 10/2008 |
| WO | WO-2013006900 A1 | 1/2013 |

* cited by examiner

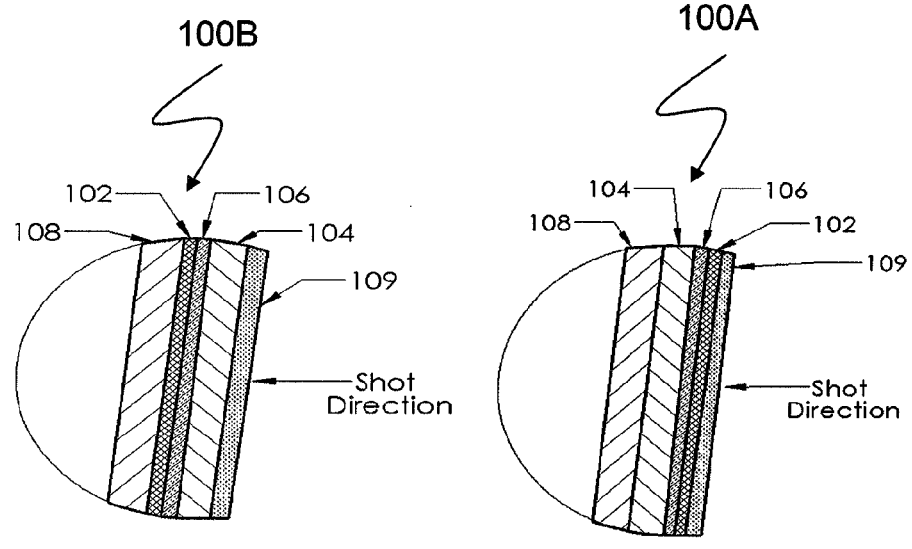
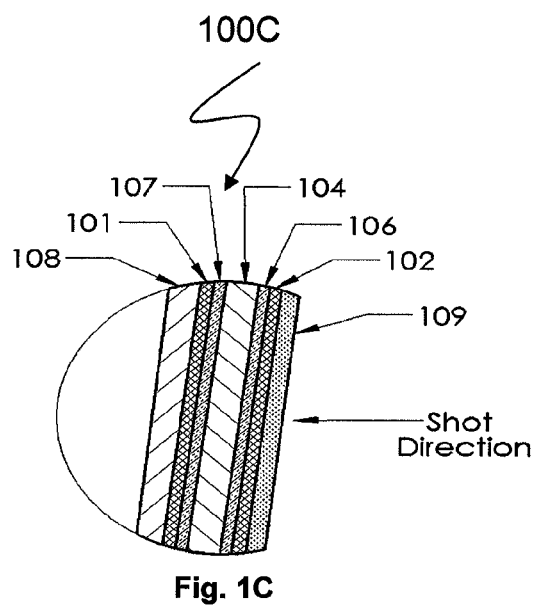

Detail B

ANTIBALLISTIC ARTICLE AND METHOD OF PRODUCING SAME

CROSS-REFERENCE TO RELATED APPLICATIONS

The present application is a continuation of pending International patent application PCT/IL2012/000264, filed Jun. 27, 2012 which designates the United States and was published in English, and which claims priority of Israel patent application 213865, filed Jun. 30, 2011. The disclosure of the above application is incorporated herein by reference.

FIELD OF THE INVENTION

The present invention relates to the field of high performance protective materials against ballistic threats especially high power penetration projectiles. In particular, the invention relates to ceramic armor with ballistic inserts using encapsulated pre-stressed ceramics.

BACKGROUND OF THE INVENTION

Lightweight armor for ballistic protection applications, and more specifically lightweight personal armor is used to stop high and very high ballistic threats e.g. armor piercing (AP) bullets. For efficient low weight ballistic protection against high power penetration projectile, hard armor and specifically hard ceramic armor in form of monolith, plate, tiles, pellets or special shape ceramic elements is needed. Ceramic armor is typically used for personal protection, vehicles protection, ships, helicopters, and aircraft protection. In the field of personal protection ceramic monolith backed up by composite material is usually used. The ceramics are used due to their low density, high rigidity and high hardness that make them the most appropriate materials to defeat modern armor piercing projectiles. It has been found that in order to stop, i.e. prevent penetration of an AP threats at low weight, a ceramic-based composite is most suitable. A hard armor composite includes a rigid ceramic facing and a soft or laminated ballistic composite material/fabric. The composite material/fabric behind the ceramic plate serves to absorb the remaining energy of the bullet after hitting the ceramic facing and to "catch" the bullet, it's fragments and the ceramic fragments. Ballistic ceramic materials with high hardness properties are the main constituents of the armor and improving the stopping power of the armor can be achieved mainly by increasing the stopping-power of the ceramics.

U.S. Pat. No. 4,613,535 teaches that monolithic plates can be formed from fibers coated with an elastomer. If a multi-hit ballistic panel is required, i.e., one that can withstand more than one hit, it cannot be attained using monolithic inserts. For this purpose, the insert is made of separate tiles connected together, as by gluing onto a substrate. A bullet hitting the target will destroy one or more tiles at a time, and the remaining tiles serve to prevent penetration along the remainder of the insert. Such inserts are shown, for example, in Israel Patent 120854, EP 488,465, and U.S. Pat. No. 4,868,040. These inserts are generally expensive to manufacture, since each tile must be abraded to the correct size and fit on the insert. In addition, the tile connection lines and junctions are weakened points from a ballistic point of view.

U.S. Pat. No. 4,760,611 discloses a bullet-proof waistcoat consisting of a plurality of square plates linked together by hinged joints. Each plate has a ceramic core enclosed in a resilient metal, i.e., an aluminum alloy.

It is well documented that confinement increases ballistic performance of ceramics. D. Sherman, J. PHYS IV FRANCE 7 1997, showed that confinement of the ceramics is capable of generating high compression stresses that act to reduce the damage to the ceramics and hence improve the ballistic performance of the insert. Clamping the ceramics into a confinement frame and hence arresting of the ceramics induces mechanical compression stress into the ceramics and reduces significantly their damage. T. J. Holmquist, International Journal of Impact Engineering, November 2003, evaluated the response of ceramic targets with and without pre-stress subjected to projectile impact. In all cases pre-stressing the ceramics enhanced the ballistic performance, because the ceramic strength increases as the confining pressure increases. In either case, the results demonstrate that the ballistic performance of confined ceramic targets can be improved by pre-stressing the ceramic and that the pre-stressing phenomenon can be complex.

U.S. Pat. No. 6,389,594 discloses an antiballistic article including a monolithic ceramic plate, an antiballistic backing material affixed to the ceramic monolith, and an outer shell, formed of an antiballistic material including a curable resin, enclosing the backing and ceramic monolith.

This patent teaches that in order for a monolithic ceramic to possess multi-hit capabilities these ceramics must be arrested. This is accomplished by applying iso-static force on monolith ceramics wrapped in a composite materials impregnated with thermosetting and thermoplastic composite. Upon cooling under iso-static pressure the ceramics is arrested and more shots can be stopped on the same plate. As seen above, applying internal stress and compressing the ceramic monolith is known to increase its ballistic capabilities.

GB Pat. 1352418 discloses antiballistic articles against high-speed particles by means of mouldings built up from alternating layers of sintered alumina (aluminum oxide) and metals firmly bonded to one another with inorganic bonding means such as by welding, soldering or with inorganic cements. This can be done only at very high temperatures above 500° C. and up to 1200° C. Furthermore, this patent is directed to brick-shaped blocks, which are massive and heavy blocks designed to protect walls, fortress installations, and gun sites . . . particularly . . . boats, aircraft and armored cars.

It is an object of the present invention to provide improved pre-compressed ceramic-based anti-ballistic articles.

A further object of the invention is to provide a thin light weight pre-stressed ceramic article for personal use.

Another object is to provide a method for stressing ceramic plates/tiles. The pre-compressed ceramic-based anti-ballistic articles according to the present invention have superior ballistic characteristics including significant reduction or elimination of the damage to the ceramic plate/tile when being hit, thus, providing armor plate with an increase in multi-hit capabilities. In addition, the pre-compressed ceramic-based anti-ballistic articles of the present invention are of relatively low weight, decreased thickness and low cost.

Further aims, features and advantages of the invention will become apparent from the following detailed description taken in conjunction with the following figures.

SUMMARY OF THE INVENTION

There is thus provided, in accordance with the present invention, an antiballistic article that comprises a pre-stressed ceramic plate/tile and backing material. The pre-stressed ceramic plate/tile is made by bonding a high thermal expansion material having a much higher expansion coefficient than the ceramic material, to the ceramic plate/tile at elevated temperature and preferably under pressure. Bonding is done preferably with an adhesive having a high module of elasticity and curing temperature of between 50° C. and 250° C. and preferably under pressure, to insure good adhesion of the bonded materials.

At the elevated bonding temperature the thermal expansion material is expanded considerably more than the ceramic plate/tile. Upon cooling, the thermal expansion material contracts, exerting compression stress on the ceramic plate/tile.

The ceramic plate can be made of aluminum oxide ($Al_2O_3$), boron carbide ($B_4C$), silicon carbide (SiC) titanium diboride ($TiB_2$), aluminum nitride, silicone nitride, sintered silicone carbide, sintered silicone nitride, and glass-ceramic.

The high expansion material may be—a metal or metallic alloy selected from high strength aluminum alloy as AL7075/AL6061/AL2024 alloys, high strength magnesium alloys as AZ90/AZ91, high strength steel alloys as SAE 4340/SAE 4140, high strength titanium alloys as Ti-6Al-4V or other metallic alloys such as brass, bronze, nickel alloys, tin alloys, beryllium alloys etc.

The high expansion material has an expansion coefficient at least 50% higher and preferably 200-400% or higher, than the thermal expansion coefficient of the ceramic plate/tile, and preferably has a thickness of between 0.1 mm and 2.0 mm.

The high thermal expansion material may be bonded either to the front or back face of the ceramic plate/tile or to both faces of the ceramic plate/tile.

The high thermal expansion material may be perforated in geometrical shapes such as frame type perforations, circles, squares, triangles, rectangles, hexagons, octagons or a combination thereof.

The antiballistic article may further comprise an antiballistic backing composite material/fabrics bonded to the ceramic plate or to the thermal expansion material (if bonded at the back). The backing material can be made of composite material fabrics woven roving or UD (Uni-directional) E-glass or S-glass fabrics, aramid ballistic fabrics, ultra-high molecular weight polyethylene fabrics (UHMWPE), graphite fabrics, or a combination thereof.

Aramid ballistic fabric suitable as backing material is for instance one of the following commercial fabrics: Twaron®, manufactured by Teijin Twaron® in Germany/The Netherlands and Kevlar® 29 manufactured by Dupont USA.

UHMWPE fabric suitable as backing material can be one of the following commercial fabrics: Spectra Shields® PCR, manufactured by Honeywell International, Inc. of Colonial Heights, Va. or Dyneema® HB2/HB26/HB50 manufactured by DSM USA or DSM of the Netherlands.

In accordance with another embodiment of the present invention, the antiballistic article may further comprise an anti-shock layer made of foam or rubber material bonded to the front face of the antiballistic article as is commonly done in practice to defend the ceramic plate from breaking. The antiballistic article may further comprise an antiballistic backing made of metals such as: Aluminum alloys, Titanium alloys, steel alloys, magnesium alloys or a combination thereof.

In accordance with a further embodiment of the present invention, the entire antiballistic article is encapsulated in an outer shell of antiballistic material with curable resin selected from epoxy (e.g., FM73 of Cytec, EA 9628 & EA 9309 of Hysol/Henkel, F161 of HEXCEL, Araldite 2015 of Huntsman), polyester, phenolic (e.g., HEXCEL F120 or HT93, or polyurethane resin (e.g., RENCAST FC 52 (Vantico), Biresin U1305 or SIKAFLEX 201 of Sika Deutschland) or thermoplastic resin (e.g. polyolefin, polyester, polyurethane, PVC and other vinyl thermoplastic resins).

This outer shell can be selected from aramid fabric, UHMWPE, E-glass, S-glass, graphite fabric, or combination hybrids and can have the form of a plain weave cloth, a unidirectional tape, filament winding, or braiding.

The antiballistic article of the present invention can be shaped as an insert for personal body armor like SAPI/ESAPI/XSAPI or the like, or for antiballistic, helmets.

The ceramic plate/tile has either a flat, curved or multi-curved shape, with a thickness of 2.0-15.0 mm.

Suitable bonding adhesives are epoxy glues as 3M™, structural adhesive film AF163-2, Hysol® EA 9628, or ceramic glue as AREMCO adhesive 503, 552 or 516.

In accordance with a further embodiment of the present invention, the antiballistic article has increased multi-hit capability.

In accordance with a further embodiment of the present invention, the antiballistic article provides a decreased front spall and debris ejection angle compared to regular non-compressed ceramic.

In accordance with a further embodiment of the present invention, the antiballistic article provides a front spall and debris ejection angle decreased by at least 15% and usually by 30%-60% compared to regular non-compressed ceramic.

In accordance with the present invention there is also provided a method of preparing the described antiballistic article including the following steps: (1) providing a ceramic plate/tile; (2) providing a thermal expansion material having a high thermal coefficient; (3) providing an adhesive with a high module of elasticity and curing/bonding temperature between 50° C.-250° C.; (4) bonding the thermal expansion material to the ceramic plate/tile with the adhesive at high temperature in a vacuum bag kept at a temperature of between 50° C. and 250° C. and preferably under external pressure applied by an autoclave or a hydroclave. Alternatively, bonding can be done, by a press operation using adequate heated mold, thereby adhering the relatively much expanded thermal expansion material to a surface of the relatively little expanded ceramic plate/tile; and (5) cooling the bonded article to room temperature, thereby contracting the expanded thermal expansion material on the surface of the ceramic plate/tile, producing compression stress in the ceramic plate/tile. The high thermal expansion material may be bonded to one or both surfaces of the ceramic plate. Bonding the antiballistic composite backing material to either the ceramic plate/tile or the high thermal expansion material (if the high thermal expansion material is bonded at the back face of the ceramic plate/tile). Furthermore, the entire antiballistic article can be encapsulated in an outer shell of antiballistic material with curable resin or thermoplastic resin.

In accordance with another embodiment of the present invention, the thermal expansion material may be bonded to the ceramic plate after bonding/attaching the backing material to the ceramic plate.

In another embodiment the thermal expansion material is bonded to the ceramic plate and the backing material is bonded to the ceramic plate in a single stage.

The antiballistic article of the present invention can be made in many shapes for use in personal body armor or as anti-ballistic helmets.

The antiballistic article of the present invention may provide increased multi-hit capability of the antiballistic article, decreased front spall and debris ejection angle by at least 15% min, decreased total weight of antiballistic article by 5-25%, decreased raw material cost by 5% min, decreased thickness of article by 10-25%, and increased durability against drops and hits.

DETAILED DESCRIPTION OF THE INVENTION

The present invention provides a practical way to enhance ballistic behavior of ceramic plate monolith/tiles/pellets and glass-ceramic plate monolith/tiles/pellets (hereinafter referred to as ceramic monolith plate/tiles), by inducing pre-compression stress in the ceramic plate/tile by means of a novel process. The enhanced ceramic plate/tile is prepared by bonding at high temperature, a high thermal expansion coefficient material such as, for instance, thin light metal or metallic alloy, or metallic fabric or metallic grid/net to the ceramic plate/tile which has a relatively low expansion coefficient. The bonding is done at an elevated temperature up to 250° C. When the high temperature bonded ceramic plate/tile is cooled to room temperature, the high expansion material contracts to a greater extent than the ceramic plate/tile, thus creating compression stress in the ceramic plate/tile. One can use this pre-compressed ceramic plate/tile instead of the regular ceramic plate/tile as part of a ballistic article.

A ceramic ballistic article prepared of pre-compressed ceramic plate/tile bonded to composite backing materials and encapsulated in an outer shell with curable resin or thermoplastic resin in accordance with this invention has the following advantages: (a) the total weight of the ballistic article can be decreased by about 5-25%; (b) the multi hit capability of the article is increased (the length of the cracks decrease compared to regular non compressed ceramic); (c) raw materials cost savings (a decrease of about 5-20% of the materials cost); (d) a significant decrease of about 20% min and usually 30%-60% in the front spall and debris ejection angle compared to regular non compressed ceramic (see FIG. 4); (e) overall thinner module size (a decrease of about 10-25%), and (f) better durability of the ceramic plate/tile against drops and accidental hits due to the fact that compressed ceramic plate/tile is less sensitive to crack propagation than conventional ceramic plate/tile, and due to the fact that the layers of the high expansion material and the glue protect the ceramic plate/tile (when bonded in front of the ceramic plate/tile).

Ceramic monolith plates/tiles are well known and are made from aluminum oxide ($Al_2O_3$), boron carbide ($B_4C$), silicon carbide (SiC) titanium diboride ($TiB_2$), aluminum nitride, silicone nitride, sintered silicone carbide, sintered silicone nitride, and glass-ceramic. Such plates/tiles may be flat, raised edge, curved or have a multi-curved shape. However, for personal protection, a monolithic ceramic curved or multi-curved plate/tile is preferred.

The ceramic monolith plate/tile of the present invention can be thinner about 0.5 to 2.0 mm, less than the thickness of conventional (regular) ceramic plate/tile used for the same ballistic purpose. Alternatively, with the inventive plate/tile, it is possible to maintain the conventional thickness of the ceramic plate/tile, and reduce thickness and weight of the backing material, alternatively, it is possible to reduce the thickness and weight of both the ceramic plate/tile and backing material, hence reducing the total weight of the ballistic article.

The high expansion material will generally have a thickness ranging between 0.1 and 2.0 mm and is preferably in the form of metallic sheet, metallic fabric, or metallic grid/net and is preferably made of metals or metallic alloys such as high strength aluminum alloys, high strength magnesium alloys, high strength steel alloys or high strength titanium alloys.

The high expansion material should be pre-formed to the shape of the ceramic plate before bonding.

It should be noted that the flexibility of some high thermal expansion material may be limited, and therefore if a multi-curved ceramic plate/tile (For instance, SAPI/ESAPI/XSAPI type plate) is used to create a pre-compressed ceramic plate/tile, the high thermal expansion material should be preformed to the geometric shape of the ceramic plate face before adhering them together. In the case of radial ceramic plates, there is usually no need to pre-form the high thermal expansion material to the shape of the ceramic plate if the thermal expansion material is flexible enough to bend and have the shape of the radial ceramic plate face under vacuum and/or external pressure.

The adhesive, in accordance with the present invention, is a stiffening-type adhesive having high module of elasticity, preferably greater than 200 kg/mm$^2$ and a curing temperature for thermosetting adhesives between 50° C.-250° C. or bonding temperature of 50° C.-250° C. for thermoplastics adhesives. The adhesive can be thermoplastic or thermosetting. Suitable adhesive may be selected among others, from epoxy and ceramic glues.

The pre-compressed enhanced ceramic-based ballistic article of the present invention has the advantage of having increased multi-hit capability. Multi-hit capability is the ability of the ballistic armor to stop more shots at shorter intervals between shots without penetration. The compression stress in the pre-compressed ceramic plate/tile prevents long cracks to be created around the hitting point and their length is usually less than half of the crack's length in regular (non pre-compressed) ceramic armor. For that reason closer shots can be stopped, and multi-hit capability increases significantly.

Another advantage of the ceramic-based antiballistic article of the present invention is that it has a significantly reduced front spall and debris ejection angle compared to an article containing regular (non pre-compressed) ceramic plate (see FIG. 4).

BRIEF DESCRIPTION OF THE DRAWINGS

The present invention will be further understood and appreciated from the following detailed description with the drawings in which:

FIGS. 1A-1C are schematic cross-sectional illustrations of 3 configurations of pre-compressed ceramic-based anti-ballistic articles in accordance with the present invention.

DETAILED DESCRIPTION OF THE DRAWINGS

Figure 2A:
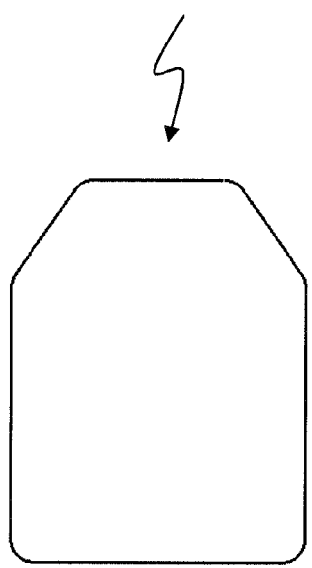
FIGS. 2A-2D illustrate different embodiments of the high thermal expansion material that can be bonded to the ceramic tile/plate for use in for personal armor.

FIGS. 1A-1C illustrate cross sections of pre-compressed composite ballistic articles 100A-100C. The articles 100A-100C comprise a high thermal expansion material 101/102 which is bonded with an adhesive layer 106/107 to ceramic plate/tile 104. Backing composite material 108 is bonded to the back side of the ballistic articles 100A-100C. The ballistic article may further comprise an anti-shock layer 109 bonded in front of the ballistic article either directly to the ceramic plate (FIG. 1B) or to the high expansion material (FIG. 1A and FIG. 1C).

In FIG. 1A the ballistic article 100A has a backing composite material 108 bonded/press bonded/attached in any other way to one side of the ceramic plate/tile 104 while on the opposite side of the ceramic plate/tile 104 is the thermal expansion material 102 bonded to the plate/tile 104 with adhesive 106.

As seen in FIG. 1A, antiballistic article 100A may further comprise an anti-shock layer 109 bonded to the front face of the thermal expansion material 102.

In FIG. 1B the ballistic article 100B has high thermal expansion material 102 bonded to the back face of the ceramic plate/tile 104 with adhesive 106. Backing material 108 is bonded/pressed-bonded/attached in any other way to high thermal expansion material 102. Antiballistic article 100B may further comprise an anti-shock layer 109 bonded to the front face of the ceramic plate/tile 104.

In FIG. 1C the ballistic article 100C has both sides of the ceramic plate/tile 104 bonded to thermal expansion materials 101 and 102 with adhesive layers 107 and 106 respectively. Backing material 108 is bonded/pressed-bonded/attached in any other way to the high thermal expansion material 101. High expansion materials 101 and 102 can be identical or different in material type and/or characteristics. Similarly, adhesives 106 and 107 can be identical or different in material type and/or characteristics. As seen in FIG. 1C, antiballistic article 100C may further comprise an anti-shock layer 109 bonded to the high thermal expansion material 102.

It should be noted that by using different high expansion materials and/or perforated and non-perforated high expansion materials and/or differently perforated high expansion materials and/or different thickness of high expansion materials, and/or other adhesives types and/or other bonding temperature of the adhesives or a combination thereof, one may vary the degree of compression stress inserted to ceramic plate/tile. For instance, one may create an article having higher compression stress in front of the ceramic plate than in the back or vice versa. Furthermore, one may control the magnitude of the compression stress along the thickness of the plate.

Figure 2B:
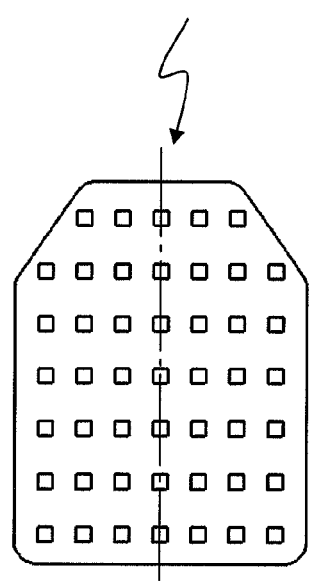
Figure 2C:
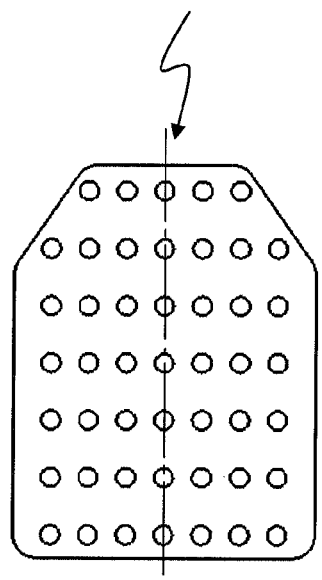
Figure 2D:
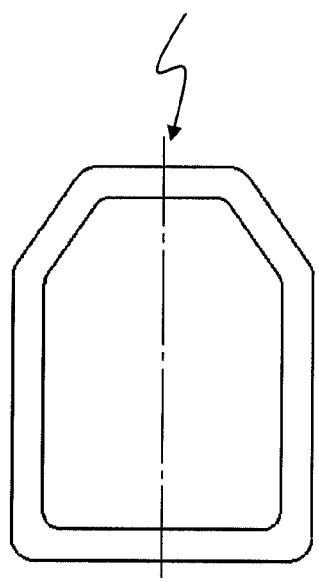

FIGS. 2A-2D illustrate front view of the high expansion material geometry for personal armor (FIG. 2A), and three schematic options of it's perforation (FIG. 2B-2D). The perforation is an option to further decrease the weight of the ballistic article. FIG. 2A illustrates the high expansion material geometry 200A for personal armor. Preferred geometry of the high expansion material is identical to the face of the ceramic plate/tile which it is bonded to. FIGS. 2B-2D illustrate three types of perforation schemes: squares 200B (FIG. 2B), circles 200C (FIG. 2C), and "frame" type perforations 200D (FIG. 2D). Other perforation geometries such as, for instance, triangular, rectangular, hexagonal, octagonal or a combination thereof may be implemented as well. It should, however, be noted that perforation/"framing" may decrease the compression stress in the ceramic plate/tile depending upon perforation/"framing" geometry.

It should be noted that a combination of perforated/non-perforated or perforated/perforated expansion materials can be used in ballistic articles such as the one illustrated in FIG. 1C where high thermal expansion materials 101 & 102 are bonded onto both sides of the ceramic plate/tile 104.

Figure 3A:
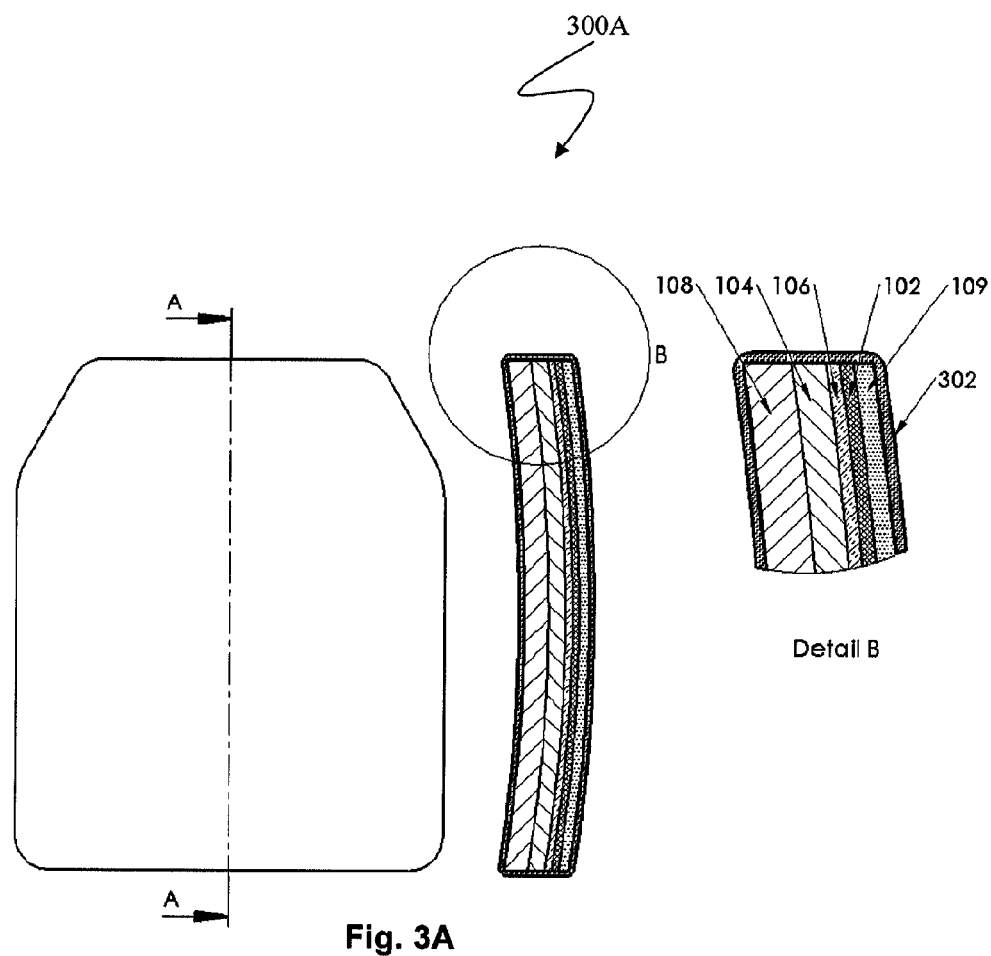
FIGS. 3A-3C illustrate front and cross-sectional views of 3 embodiments of pre-compressed ceramic plates/tiles in accordance with the present invention for personal anti-ballistic articles.
Figure 3B:
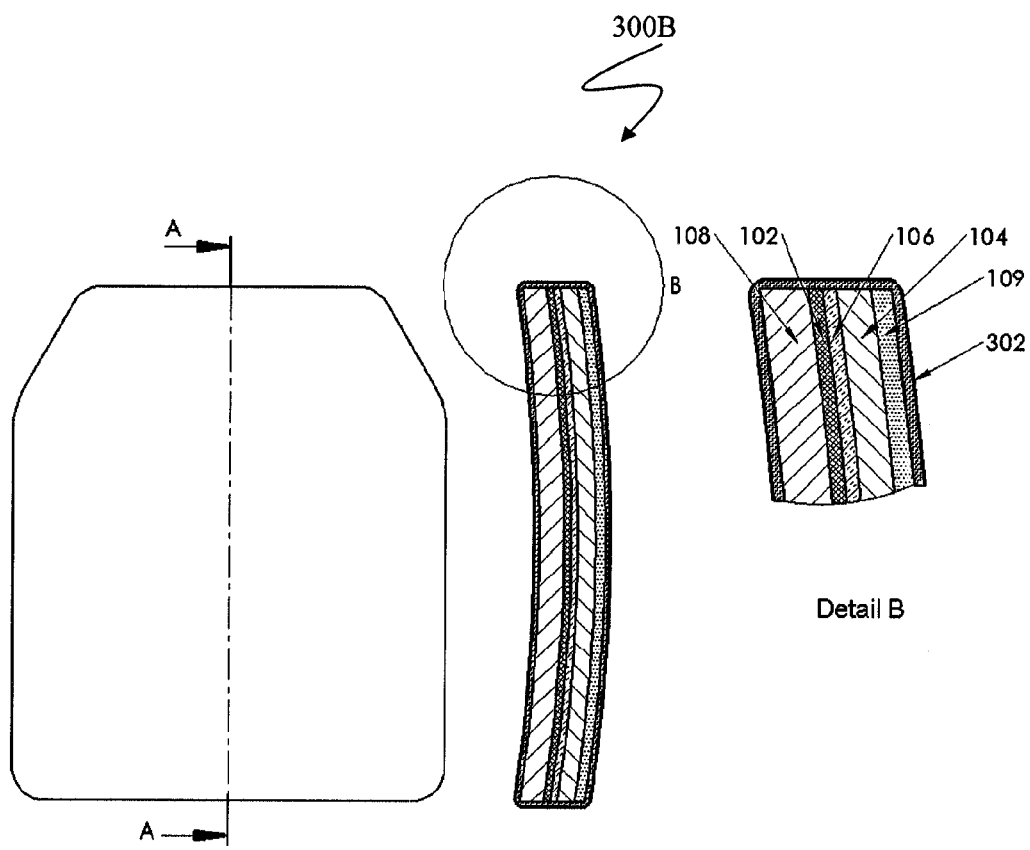
Figure 3C:
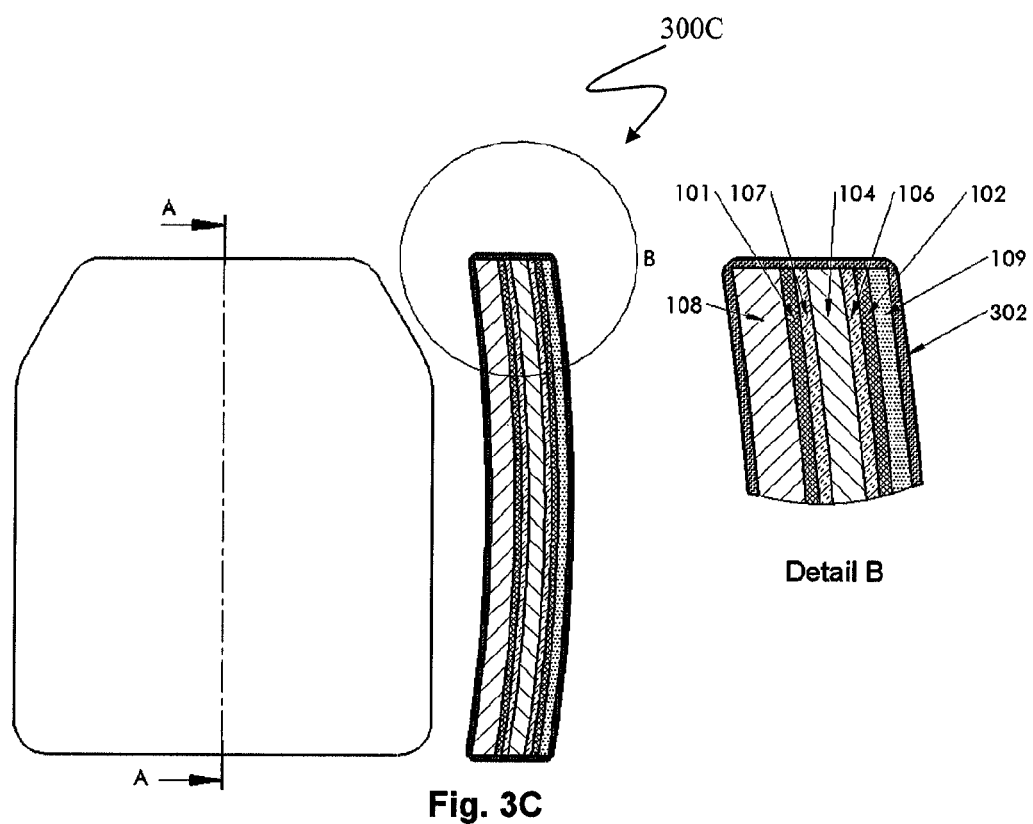

FIGS. 3A-3C illustrate front and cross-sectional views of three pre-compressed ceramic-based anti-ballistic articles 300A, 300B and 300C, in accordance with another embodiment of the present invention.

The cross sections of the articles 300A-300C are basically the same as those shown in FIGS. 1A-1C respectively, with the exception that the entire articles 300A-300C are encapsulated in an outer shell 302 made of a ballistic fabric by curing with thermosetting resin or bonded with thermoplastic resin. This outer shell 302 is an essential component as it increases the multi-hit and the survivability capability of the anti-ballistic articles 300A-300C. In accordance with other embodiments of the present invention, the anti-shock layer 109 may be bonded to the outer face of the outer shell 302 in front of the ballistic article. This way, the outer shell 302 encapsulates all layers of the article shown in FIG. 3A-3C except the anti-shock layer 109 that is bonded to the outer face of the outer shell in front of the ballistic article.

Figure 4:
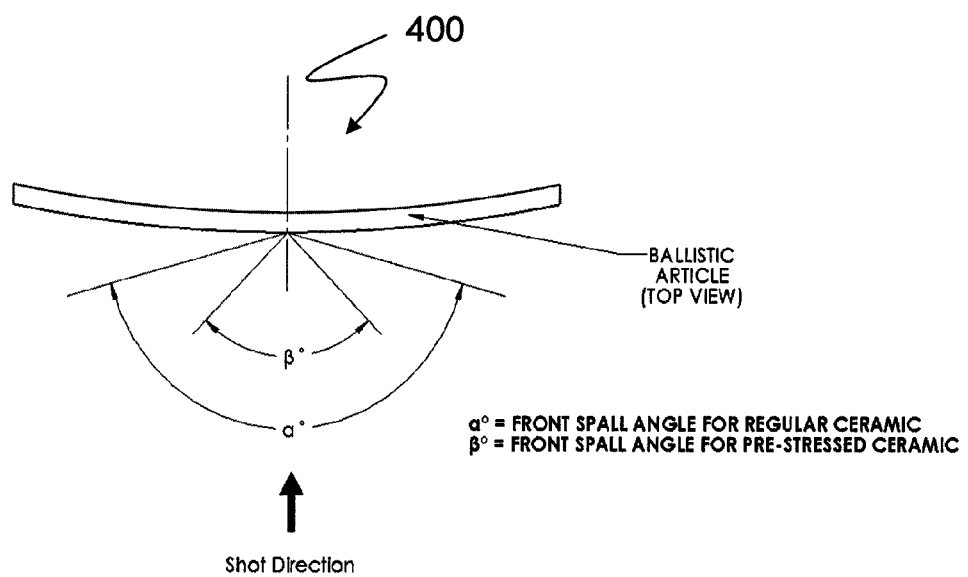
FIG. 4 is a schematic view comparing the front spall and debris angle of a pre-compressed ballistic ceramic plate/tile of the present invention with that of a regular (non-pre-compressed) ballistic ceramic plate/tile.

FIG. 4 illustrates the front spall angles for pre-compressed and regular (non pre-compressed) ceramic plate/tile.

Typical tests results show $\alpha \geq 1.5\beta$ where $\beta$ is the front spall angle of a hit on a pre-stressed ballistic ceramic article and $\alpha$ is the front spall angle of a hit on a regular ballistic ceramic article.

Such significant decrease is advantageous and very important for personal ballistic protection since a large front spall and debris ejection angle can cause injuries to the person's neck, chin and arms. To prevent such injuries, i.e., to reduce the front spall and debris ejection angle, ballistic fabrics are usually attached to the front face of the armor. Using the pre-compressed ceramic plate/tile of the present invention can save using these ballistic fabrics or at least some of them, and thus, keeping the weight, cost and thickness of the article relatively low.

Preparation of Pre-Compressed Ceramic Anti-Ballistic Articles

In accordance with the present invention, the following parameters should be considered in the design of pre-compressed monolith ceramic-based ballistic articles for personal protection based on the ballistic threats against which the articles will be used: (a) type and thickness of ceramic plate, (b) type and thickness of high expansion material/materials, (c) type and thickness of adhesive, (d) bonding face (front/back/both), (e) bonding temperature, and (f) adequate composite backing material for absorbing the remaining energy and trauma (dynamic back face deformation in personal ballistic protection article). It is obvious that bonding at higher temperatures or using materials with greater difference in coefficient of thermal expansion will induce higher compression and shear stresses at the ceramic plate and higher tension and shear stresses at the high expansion material and the adhesive. All materials involved in bonding should be designed to withstand those increased stresses.

The pre-compressed ceramic-based anti-ballistic articles in accordance with the present invention are prepared as follows.

(a) the high expansion material is bonded to the ceramic plate/tile on the chosen side/both sides at a high temperature, between 50° C. and 250° C., (b) cooling the bonded plate/tile to room temperature, thereby contracting the expansion material to a greater extent than the ceramic plate/tile, thus creating compression stress in the ceramic plate/tile, (c) bonding backing composite material either to the back side of the ceramic plate/tile or to the high expansion material (if bonded to the back of ceramic plate), and encapsulating the ballistic article with ballistic fabric with curable resin or thermoplastic resin and (d) bonding (if needed) an anti-shock layer to the front face of either the thermal expansion material or the ceramic plate/tile or to the front side of the outer shell.

In accordance with some embodiments of the present invention, a preferred way to create the bonding is done by isostatic compression such as hydroclave process/isostatic press process/autoclave process, or vacuum bag process as described in U.S. Pat. No. 6,389,594.

In accordance with some embodiments of the present invention, the above stages (a) and (c) may be combined into a single stage that may be followed by cooling down to room temperature, i.e., by stage (b).

Furthermore, the thickness of the high expansion material should be optimized so that it will be thick enough to induce high compression force into the ceramic plate, but at the same time it will be kept as thin as possible to minimize the total weight of the article. In accordance with some embodiments of the present invention, the high expansion material has a typical thickness ranging between 0.1-2.0 mm and preferred thickness in the range of 0.25-0.75 mm.

EXAMPLE

In order to stop a 30-06 APM2 bullet 868-884 m/sec at a personal ballistic plate with a backup of NIJ LEVEL IIIA vest we used an article comprising an 8.5 mm thick SiC ceramic plate with 9 mm of UHMWPE backing material all encapsulated in aramid fabric and pressed isostaticly in an autoclave for a total areal weight of 37.7 kg/m2. Alternatively, one can use an article comprising 0.5 mm thick aluminum sheet type AL7075-T6 bonded onto the front face of an 8.0 mm thick SiC ceramic plate with Hysol® EA9628 epoxy at 140° C. and then cooled down to room temperature. The article may further comprise a 6.5 mm thick UHMWPE backing material where all the layers are encapsulated in aramid fabric with epoxy resin and pressed isostaticly in an autoclave for a total areal weight 35.1 kg/m2.

The resulting articles have the following characteristics: (a) total weight reduction of 7%; (b) multi hit capability increases from 2 bullets per plate to 3 bullets per plate; (c) 10% raw materials cost savings; (d) front spall and debris angle improves from 1200 to 600; and (e) 2 mm thinner module (10% reduction in thickness).

The invention claimed is:

1. A method of preparing a lightweight pre-stressed antiballistic monolith ceramic article comprising:
    providing a monolith ceramic plate/tile selected from a group consisting of aluminum oxide ($Al_2O_3$), boron carbide ($B_4C$), silicon carbide (SiC), titanium diboride ($TiB_2$), aluminum nitride, silicone nitride, sintered silicone carbide, sintered silicone nitride, and glass-ceramic;
    providing a lightweight high thermal expansion material selected from a metal or metal alloy in the form of a sheet or fabric or grid/net having a thickness of between 0.1 mm and 2.0 mm, and having a thermal expansion coefficient at least 50% greater than that of the ceramic plate/tile;
    providing a bonding adhesive selected from thermosetting or thermoplastic adhesives having a module of elasticity greater than 200 kg/mm$^2$ and a curing temperature of 50° C. to 250° C.;
    bonding the lightweight high thermal expansion material to one or more surfaces of the ceramic plate/tile with the adhesive under bonding conditions selected from the group consisting of (a) bonding under vacuum at a temperature of between 50° C. and 250° C.; (b) bonding under vacuum at a temperature of between 50° C. and 250° C. with added external pressure in an autoclave/hydroclave; and (c) bonding by a press operation using adequate heated mold, thereby adhering the expanded thermal expansion material to a surface of the ceramic plate/tile; and
    allowing the bonded article to cool to ambient temperature, thereby contracting the expanded thermal expansion material on the surface of the ceramic plate/tile producing compression stress in the ceramic plate/tile.

2. A method in accordance with claim 1, further comprising bonding an antiballistic backing material either to the ceramic plate/tile or to the high thermal expansion material.

3. A method in accordance with claim 1, wherein the thermal expansion material is bonded to the ceramic front face of the plate/tile after bonding a backing material to the ceramic plate/tile.

4. A method in accordance with claim 1, wherein bonding of the thermal expansion material to the ceramic plate/tile and bonding a backing material to the ceramic plate/tile are done in a single stage.

5. A method in accordance with claim 1, wherein the high thermal expansion material is selected from the group consisting of high strength aluminum alloy, high strength magnesium alloy, high strength steel alloys, high strength titanium alloys or other metallic alloys such as brass, bronze, nickel alloys, and tin alloys.

6. A method in accordance with claim 2, wherein the ceramic plate/tile and backing material is encapsulated in an outer shell of antiballistic material selected from the group consisting of aramid, E-glass, S glass, polyethylene (UHMWPE), PPTA, graphite, and combination hybrids thereof.

7. A light weight antiballistic article in accordance with claim 1, formed in the shape of an insert for personal body armor, helmet, or antiballistic panels.

* * * * *